UNITED STATES PATENT OFFICE.

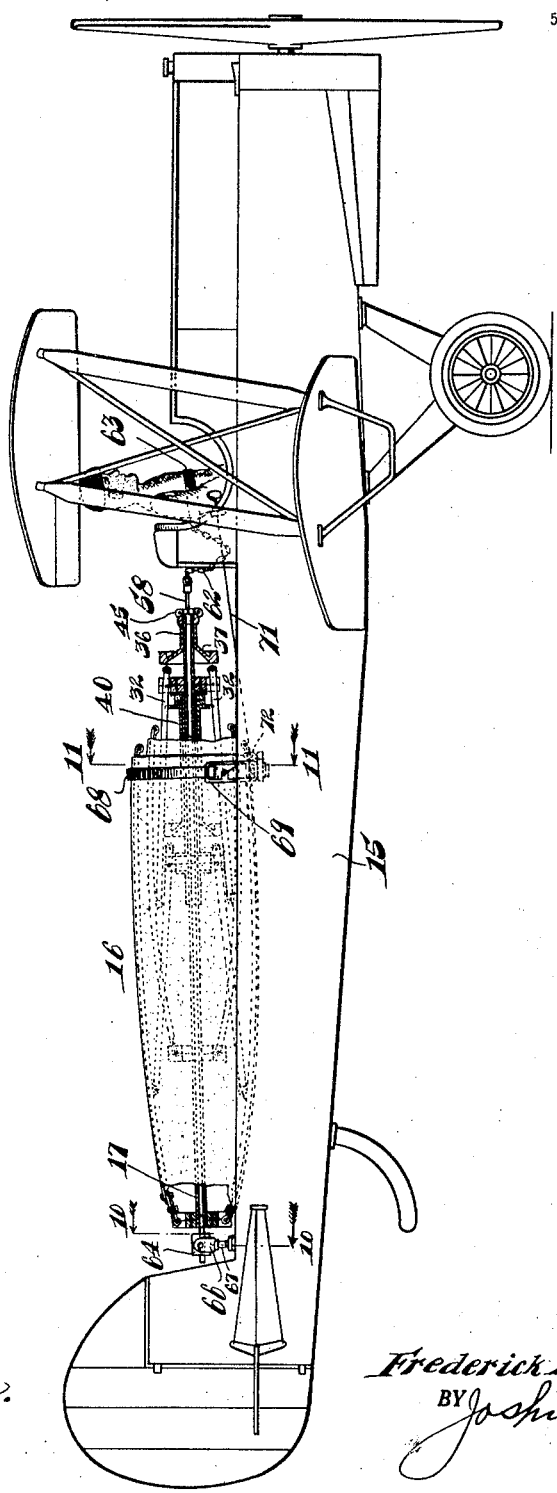

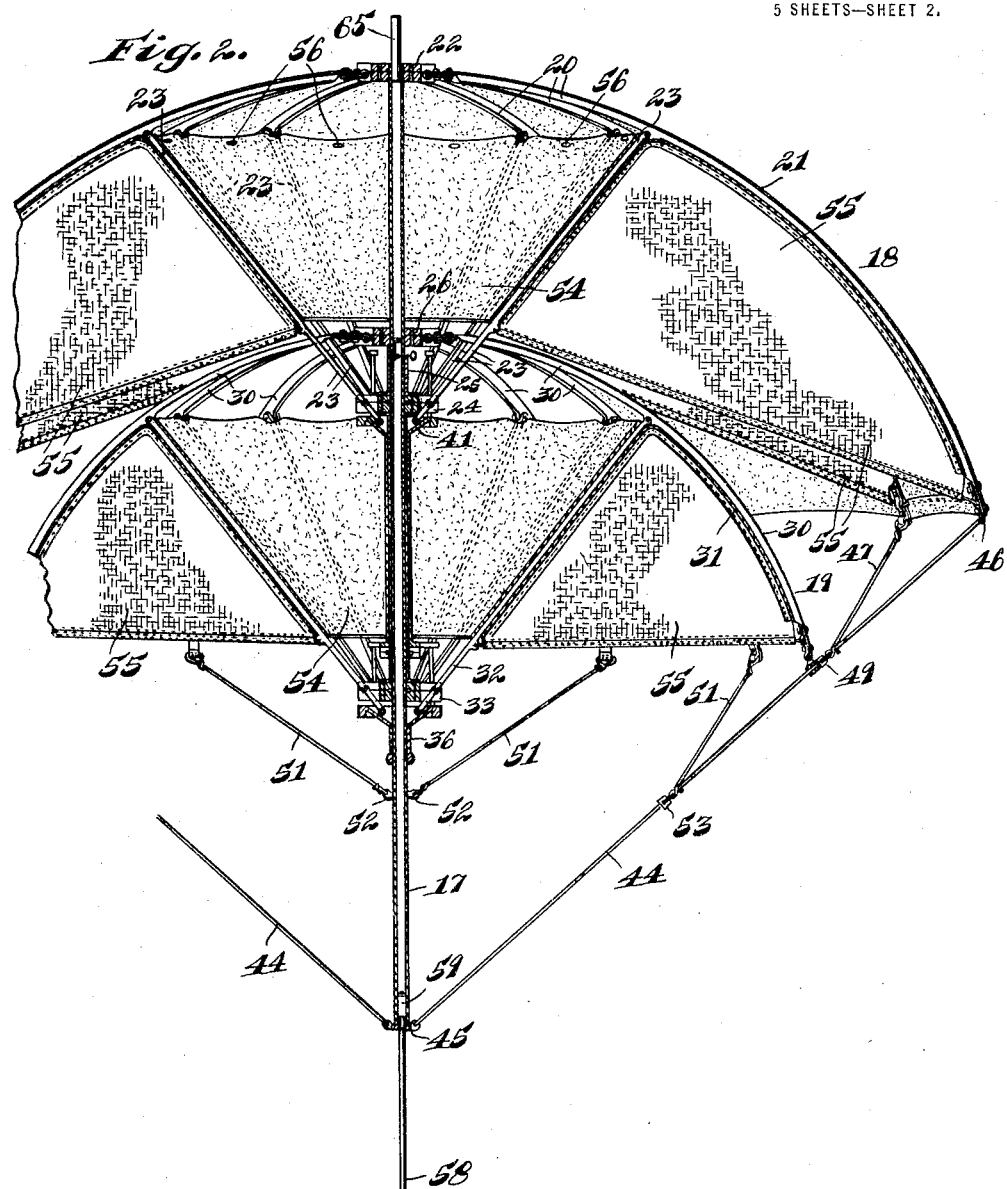

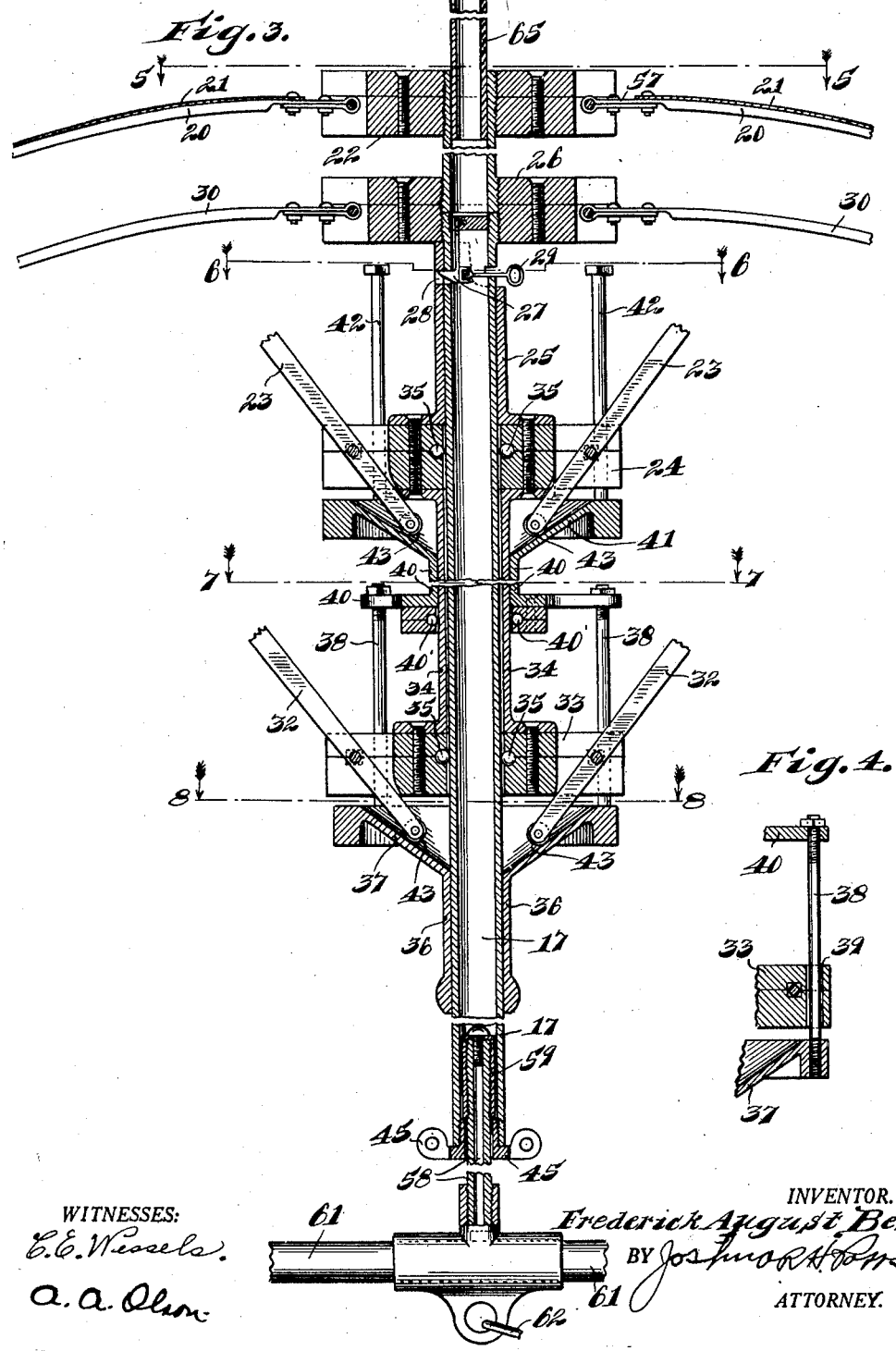

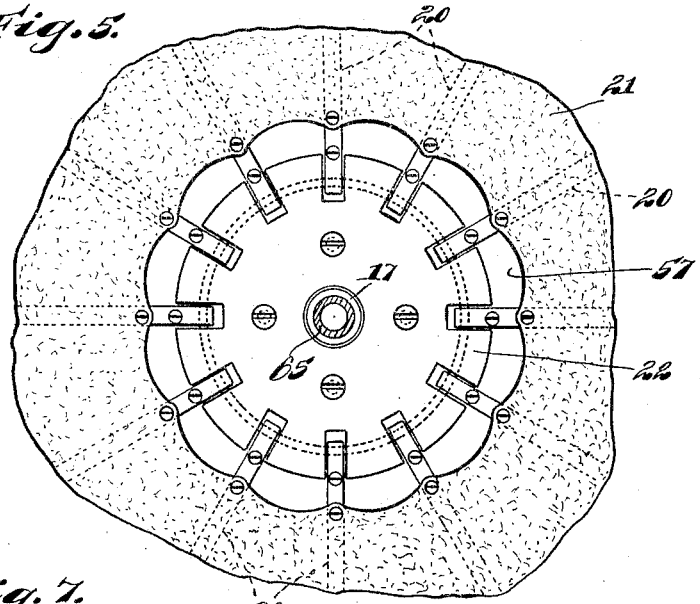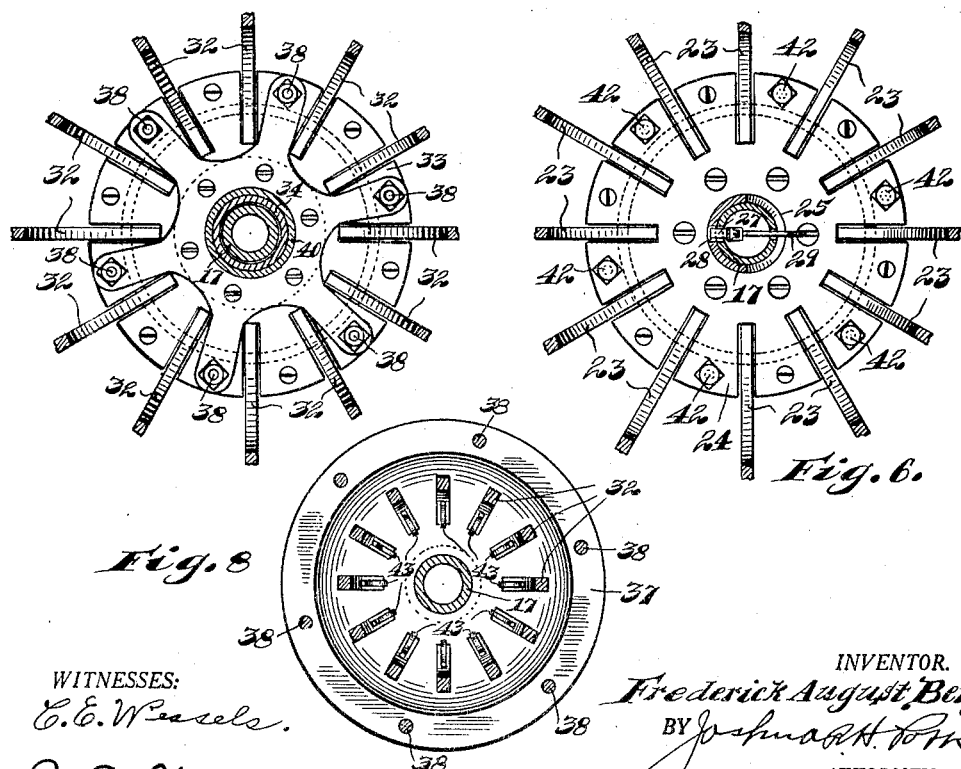

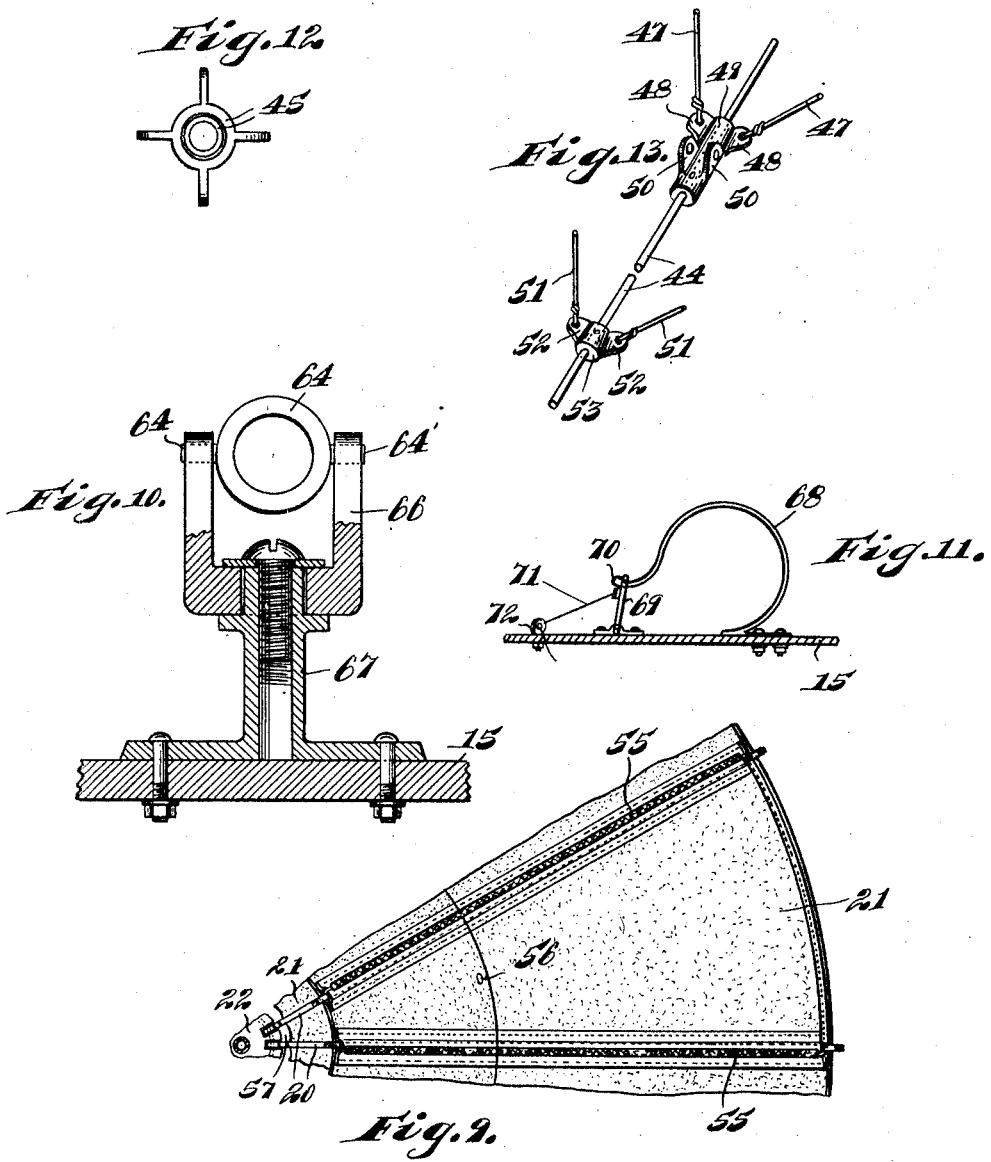

FREDERICK AUGUST BERG, OF CHICAGO, ILLINOIS.

PARACHUTE FOR FLYING-MACHINES.

1,329,359.  Specification of Letters Patent.  Patented Feb. 3, 1920.

Application filed February 15, 1919. Serial No. 277,221.

*To all whom it may concern:*

Be it known that I, FREDERICK A. BERG, a citizen of the United States, and a resident of the city of Chicago, county of Cook, and State of Illinois, have invented certain new and useful Improvements in Parachutes for Flying-Machines, of which the following is a specification.

My invention relates to improvements in parachutes for emergency use in connection with flying machines, and has for its object the production of a parachute of this character which will be of durable and economical construction and highly efficient in use.

Other objects will appear hereinafter.

The invention consists in the combinations and arrangements of parts hereinafter described and claimed.

The invention will be best understood by reference to the accompanying drawings forming a part of this specification, and in which;

Figure 1, is a partially sectional side elevation of a flying machine equipped with a parachute embodying the invention, Fig. 2, a central vertical section of the parachute in distended or unfolded condition, Fig. 3, an enlarged central section through the central or staff portion of the parachute, with the parts shown in the position assumed thereby when the parachute is in distended or unfolded condition, Fig. 4, a fragmental sectional detail of a part of the construction seen in Fig. 3, Figs. 5, 6, 7 and 8, detail sections taken on substantially lines 5—5, 6—6, 7—7 and 8—8, respectively, of Fig. 3, Fig. 9, a bottom plan view of a portion of one of the sustaining elements showing one of the radial compartments thereof, Fig. 10, an enlarged detail section taken on substantially line 10—10 of Fig. 1, Fig. 11, a detail section taken on substantially line 11—11 of Fig. 1, the parachute being omitted, Fig. 12, an end view of the lower terminal member of the central staff of the parachute, and Fig. 13, a fragmentary perspective view illustrating the connection of the supplemental stay members with the main stay members of the parachute.

The preferred form of construction, as illustrated in the drawings, is shown applied to an aeroplane 15 which may be of any ordinary or approved design, capable of accommodating the parachute 16 hereinafter described.

Said parachute, as seen in Figs. 2 and 3, consists of a central tubular staff 17 upon the upper end portion of which are mounted two superposed sustaining elements 18 and 19. The sustaining element 18 is formed of a plurality of spaced radial ribs 20 over which is spread a suitable covering 21, said ribs being pivotally connected with a collar 22 which is anchored to the staff 17. Coöperating with the ribs 20 are brace rods 23, the lower or inner ends of which are pivotally connected with a collar 24 slidably mounted upon the staff 17, as clearly seen in Fig. 3. Secured to and extending upwardly from the collar 24 is a sleeve 25, upward movement of said collar and sleeve upon staff 17 being limited by a collar 26 fixed to said staff, against which the upper end of said sleeve is adapted to engage, as clearly seen in Fig. 3. Said sleeve, and hence the collar 24, is locked at its upper terminal of movement by a spring catch 27 arranged in the staff 17, the lower end of said catch projecting therefrom for engagement with a slot 28 formed in sleeve 25, the arrangement being such that said catch will automatically engage with the opening 28 upon upward sliding of sleeve 25 to lock said sleeve at its upper terminal of movement. Said catch is retracted to release the sleeve by means of an exteriorly projecting handle 29 connected with the lower end of said catch.

The sustaining element 19 is of substantially the same construction as element 18, comprising a plurality of spaced radial ribs 30 pivotally connected at their inner ends with the collar 26. To the ribs 30 is fastened a suitable covering 31, the coverings 21 and 31 being of any suitable collapsible material, fabric being preferably employed. Coöperating with the ribs 30 are brace rods 32, the inner ends of which are pivotally connected with a collar 33 which is slidably mounted upon staff 17. The collars 24 and 33 are rigidly connected by a sleeve 34 which slidably embraces staff 17. To alleviate friction, ball bearings 35 are interposed in or carried by collars 24 and 33, which engage with the staff 17, as clearly seen in Fig. 3. The collars 22, 24, 26 and 33 are all of split construction, the parts being screwed together, this construction, in connection with collars 24 and 33 affording a convenient arrangement for the accommodation of the ball bearings 35.

Folding and unfolding of the sustaining elements 18 and 19 may be effected manually through the medium of a handle-forming sleeve 36, which is slidably mounted upon the lower end of staff 17. The upper end 37 of sleeve 36 is of conical cup form for engagement with the lower or inner ends of brace rods 32. The upper end of sleeve 36 carries bolts 38 which pass loosely through openings 39, (see Fig. 4) formed in collar 33, the upper ends of said bolts being rigidly fastened to laterally projecting ears formed at the lower end of a sleeve 40 slidably mounted upon the sleeve 34. Ball bearings 40' are carried at the lower end of sleeve 40 which engage with the sleeve 34 to alleviate friction. The upper end 41 of sleeve 40 is of the same formation as the member 37 for engagement with the lower or inner ends of brace rods 23. Projecting upwardly from the upper end of sleeve 40 are rods or bolts 42, which pass loosely through the collar 24, the members 42 being provided with heads at their upper ends to limit downward sliding of the same in collar 24.

The arrangement is such that an operative connection between the operating sleeve 36 and the brace rods coöperating with the sustaining elements is established, so that upon upward movement of said sleeve said sustaining elements will be caused to unfold or distend, whereas, upon downward movement of said sleeve, said sustaining elements will be folded or collapsed. In the unfolding or distention of the sustaining elements, the sleeve 36, in moving upwardly, causes simultaneous upward movement of the sleeve 40 with which the same is connected by bolts 38. In this upward movement, the conical or cup shaped upper ends of sleeves 36 and 40 engage with the lower or inner ends of brace rods 23 and 32 in order to effect an initial outward tilting of said brace rods prior to the upward movement of the lower ends of the brace rods which, of course, does not take place until the upper ends of said sleeves contact with the collars 24 and 33. To alleviate friction, the inner or lower ends of brace rods 23 and 32 are provided with rollers 43 for contact with the surfaces engaged thereby. The operation described is much the same as that described and claimed in my co-pending applications, Serial Number 213,050, filed February 19, 1918, for parachutes, and Serial Number 267,285, filed December 18, 1918, for flying machines, no claim for this detail of the construction being made in this application, the same being covered in the co-pending applications referred to.

The outer ends of certain of the ribs of the sustaining elements 18 and 19 are connected by flexible stay wires 44, which are connected at their inner ends with a collar 45 fixed to the lower end of staff 17. The upper ends of said stay wires are connected directly to the outer ends of certain of the ribs 20 of element 18, the adjacent ribs at either side of that engaged by each wire 44 being engaged by flexible supplemental stay wires 47 with laterally projecting ears 48 upon a sleeve 49 fixed to the adjacent stay wire 44, as clearly seen in Fig. 13. Upon each sleeve 49 are also formed ears 50 for pivotal engagement with the outer end of the adjacent rib 30 of sustaining element 19. Similarly, adjacent ribs 30 at either side of each of said ribs thus connected with the adjacent stay wire 44 are connected by flexible supplemental stay wires 51 with laterally projecting ears 52 formed upon a sleeve 53 fixed to the adjacent stay wire 44, as seen in Fig. 13. This arrangement results in a material reduction in the number of parts employed, inasmuch as each stay wire 44 accommodates three ribs upon each of the sustaining elements, thus lightening the construction without any impairment in its efficiency.

The center of each of the sustaining elements 18 and 19 is provided with an opening 54 from which radiate vertical partitions forming downwardly opening independent radial compartments 55, as set forth in my co-pending applications above referred to. I have found that by providing small bleed openings 56 leading outwardly from the upper ends of the compartments 55 of the upper sustaining element 18, which openings 56 allow for restricted escape of the air imprisoned in said compartments, a stabilizing action results which prevents lateral rocking or oscillation of the parachute during descent. The air escaping through openings 56 enters the central opening 54 in sustaining element 18, whence the same escapes through the restricted opening 57 at the center of said element, as clearly seen in Fig. 5.

Slidably mounted in the lower end of staff 17 is a stem 58 having an enlargement 59 at its upper end, engageable with the collar 45 to limit downward movement of said stem. At the lower end of the stem 58 is provided a cross piece 61 adapted to form a seat or hand-hold for the aviator during descent. Extending from the lower end of stem 58 is a chain 62 which, during use of the device, is connected with a belt 63 arranged upon the aviator.

With this arrangement it will be seen that, in use, the parachute will always be locked to the aviator so as to be ready for instant use.

To hold the parachute in position upon the aeroplane, a ring 64 is provided at the rearward end of the aeroplane, adapted for slidable engagement by an extension 65 provided at the upper end of the staff 17, as clearly seen in Figs. 1 and 3. The ring 64 is provided with trunnions 64' pivotally mounted in a U-shaped bearing member 66 pivotally mounted upon a post 67 secured to the body of the aeroplane. With this arrangement, it will be seen that the rearward end of the parachute lying horizontally, in collapsed condition upon the aeroplane, will be securely locked to the aeroplane but in such a manner as to permit of ready disengagement thereof by simply pulling the parachute forwardly to disengage the same from ring 64. The forward end of the parachute is held by a spring band 68 having one end fastened to the aeroplane body, said band being adapted to embrace the parachute. Said band is held in embracing relation with the parachute by means of a pivotally mounted loop or link 69 adapted to frictionally engage with the free end thereof, a cord 71 being connected with the upper end of said loop which passes through guides 72 to the operator's seat of the aeroplane, where the same may be readily and easily engaged by the aviator in order to effect ready and instant rocking of said loop to release the band 68 in order to unlock the parachute. With this arrangement then, it will be seen that in case of emergency, it is only necessary for the aviator to release the band 68 as described, and pull the parachute slightly forwardly to disengage the same from ring 64. This having been done, the parachute is completely free, permitting of the aviator jumping from the aeroplane if desired. When this is done, the parachute will, through resistance offered by the air, automatically open, assistance in opening being made possible through manual shifting of the sleeve 36 by the aviator. As the parachute is fully distended or unfolded, the same will be locked through the action of catch 27.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. The combination with a flying machine, of a parachute associated therewith for emergency use; means for connecting the parachute to the operator of the machine; means for detachably fastening the parachute to the machine in collapsed condition and horizontally disposed, said last mentioned means comprising a holder mounted for universal pivotal movement with which one end of the parachute slidably engages; and fastening means engaging with the opposite end of the parachute, substantially as described.

2. The combination with a flying machine, of a parachute associated therewith for emergency use; means for connecting the parachute to the operator of the machine; means for detachably fastening the parachute to the machine in collapsed condition and horizontally disposed, said last mentioned means comprising an annular holder mounted on said machine for universal pivotal movement, with which one end of the parachute slidably engages; and fastening means engaging with the opposite end of the parachute, substantially as described.

3. A parachute comprising a plurality of spaced superposed collapsible sustaining elements; stay members coöperating with the peripheries of said sustaining elements, each of said stay members being connected with all of said sustaining elements; flexible supplemental stay members connected with and projecting from each of said stay members and connecting the same with other points on the peripheries of said sustaining elements; and tubular conecting members embracing said stay members with which said supplemental stay members engage, substantially as described.

4. A parachute comprising a plurality of collapsible sustaining elements arranged in spaced superposed relation, each of said sustaining elements having an annular partition at the central portion thereof, each of said sustaining elements being divided into a plurality of downwardly opening radially disposed independent compartments leading outwardly from the corresponding annular partition, there being comparatively small outlet openings in the annular partition of the uppermost sustaining element leading from the upper ends of the compartments of the uppermost sustaining element, substantially as described.

5. A parachute comprising a plurality of spaced superposed collapsible sustaining elements: stay members coöperating with the peripheries of said sustaining elements, each of said stay members being connected with all of said sustaining elements; flexible supplemental stay members connected with and projecting angularly from each of said stay members and connecting the same with other points on the periphery of said sustaining elements; tubular connecting members embracing said stay members; and lateral ears on said connecting members engaged by said supplemental stay members, substantially as described.

6. A parachute comprising a plurality of collapsible sustaining elements arranged in spaced superposed relation, each of said sustaining elements having an annular projection at the central portion thereof forming a central circular compartment, each of said sustaining elements being divided at the outer side of the annular projection thereof, into a plurality of downwardly opening radially disposed independent compartments, there being comparatively small outlet openings in the annular projection of the uppermost sustaining element leading from the upper ends of the radially disposed compartments of the uppermost sustaining element, and said uppermost sustaining element having a restricted outlet opening leading from the central compartment thereof, substantially as described.

In testimony whereof I have signed my name to this specification in the presence of a subscribing witness.

FREDERICK AUGUST BERG.

Witness:
ARTHUR A. OLSON.